(12) United States Patent
Meschede (10) Patent No.: US 9,013,762 B2
(45) Date of Patent: Apr. 21, 2015

(54) METHOD FOR SCANNING DOCUMENTS AND AUTOMATICALLY CONTROLLING THE FURTHER PROCESSING OF THE DOCUMENTS

(76) Inventor: Thomas Meschede, Stuttgart (DE)

(*) Notice: Subject to any disclaimer, the term of this patent is extended or adjusted under 35 U.S.C. 154(b) by 0 days.

(21) Appl. No.: 14/127,321

(22) PCT Filed: Jun. 21, 2012

(86) PCT No.: PCT/EP2012/061952
§ 371 (c)(1),
(2), (4) Date: Dec. 18, 2013

(87) PCT Pub. No.: WO2012/175605
PCT Pub. Date: Dec. 27, 2012

(65) Prior Publication Data
US 2014/0126027 A1 May 8, 2014

(30) Foreign Application Priority Data
Jun. 22, 2011 (EP) .................................. 11171030

(51) Int. Cl.
*H04N 1/04* (2006.01)
*H04N 1/00* (2006.01)
*G03G 15/00* (2006.01)
(Continued)

(52) U.S. Cl.
CPC ......... *H04N 1/00968* (2013.01); *G03G 15/607* (2013.01); *H04N 1/00366* (2013.01); *H04N 1/00392* (2013.01); *H04N 1/00811* (2013.01); *H04N 1/32042* (2013.01); *G03G 2215/00303* (2013.01); *G06K 9/2063* (2013.01); *H04N 1/00374* (2013.01)

(58) Field of Classification Search
CPC ............ G03F 7/70791; G03F 7/70716; G03F 7/70725; G03F 7/70733; G03F 9/7003; B60R 1/04; B60R 2001/1215; B60R 2001/1223; B60R 2001/1253; B60R 2001/1284; B60W 30/12; B60W 30/14; G06K 9/00798
USPC ............ 382/104; 348/148, E7.085, 149, 297, 348/297 R; 358/488, 448, 497, 496, 474
See application file for complete search history.

(56) References Cited

U.S. PATENT DOCUMENTS

| | | | |
|---|---|---|---|
| 3,804,005 A | | 4/1974 | Burger et al. |
| 5,249,827 A | * | 10/1993 | Olson ............................. 283/36 |
| 5,518,273 A | * | 5/1996 | Olson ............................. 283/36 |

(Continued)

FOREIGN PATENT DOCUMENTS

| | | |
|---|---|---|
| DE | 32 33 318 A1 | 3/1984 |
| JP | 2005 234708 A | 9/2005 |

OTHER PUBLICATIONS

See International Search Report for PCT/EP2012/061952 mailed Aug. 27, 2012.

*Primary Examiner* — Negussie Worku
(74) *Attorney, Agent, or Firm* — Maier & Maier, PLLC (57) ABSTRACT

In a method for scanning documents, in particular printed sheets of paper, and automatically controlling the further processing of the scanned documents, the following steps are carried out: manually applying at least one marking to a margin area of the document that is not printed on; scanning the document; automatically detecting the at least one marking applied to the margin area of the document; and automatically controlling the further processing of the document according to the marking applied in the margin area.

14 Claims, 7 Drawing Sheets

(51) Int. Cl.
*H04N 1/32* (2006.01)
*G06K 9/20* (2006.01)

(56) References Cited

U.S. PATENT DOCUMENTS

| | | | | |
|---|---|---|---|---|
| 5,537,190 | A * | 7/1996 | Folkins et al. | 399/41 |
| 5,631,686 | A * | 5/1997 | Castelli et al. | 347/133 |
| 5,640,647 | A | 6/1997 | Hube | |
| 5,644,408 | A | 7/1997 | Li et al. | |
| 5,739,897 | A * | 4/1998 | Frick et al. | 355/40 |
| 5,911,442 | A * | 6/1999 | Olson | 283/36 |
| 6,364,209 | B1 * | 4/2002 | Tatsuta et al. | 235/494 |
| 7,742,198 | B2 * | 6/2010 | Yada et al. | 358/474 |
| 8,284,463 | B2 * | 10/2012 | Kato et al. | 358/488 |
| 8,368,949 | B2 * | 2/2013 | Kato et al. | 358/1.2 |
| 8,570,617 | B2 * | 10/2013 | Yabuuchi et al. | 358/474 |
| 8,587,835 | B2 * | 11/2013 | Sato | 358/3.24 |
| 2008/0007802 | A1 * | 1/2008 | Viturro et al. | 358/504 |
| 2008/0050019 | A1 | 2/2008 | Morohoshi | |
| 2010/0171992 | A1 * | 7/2010 | Pinney | 358/3.29 |
| 2011/0090534 | A1 | 4/2011 | Terao | |

* cited by examiner

METHOD FOR SCANNING DOCUMENTS AND AUTOMATICALLY CONTROLLING THE FURTHER PROCESSING OF THE DOCUMENTS

BACKGROUND OF THE INVENTION

A. Field of the Invention

The invention relates to a method for scanning documents, in particular printed sheets of paper, and for automatically controlling the further processing of the documents, as proposed in claim 1, and a document according to the precharacterizing part of claim 13 adapted to be scanned and/or to be further processed mechanically and/or digitally.

As of yet, it is known to separate documents during the scanning process. Frequently, for this purpose, a blank sheet is inserted between the documents. The file size of a scanned blank page is smaller than the file size of a printed and scanned page. The file sizes will be compared, and thereby it will be detected that an empty page is arranged between the documents. These scanned documents will be stored separately from each other.

This, however, has the disadvantage that, frequently, the set resolution of the scanner is left unconsidered. Further, the increasing contamination of the scanner is not considered. As a consequence, errors may occur. Further, this method will not function correctly if the document in the stack has been fed in a skewed orientation or if, after automatic readjustment of a document, black shadows are caused on the margins. Further still, in case of a double-page scanning process, it is not considered that documents do not always contain text on both sides. This has the disadvantage that originally continuous documents will be separated.

According to a different method, use is made of a barcode. With the aid of this barcode, it is not only possible to separate the documents but, moreover, the barcode can also include information related to the document, which is required for further processing.

The barcode will mostly be adhered in the form of a barcode sticker. This has the disadvantage that the thickness of the paper is changed. This has the consequence that e.g. the double-feed control of the scanners will not function correctly. There will also be needed an additional bar code printer and further mechanics for applying the barcode on the documents. Still further, it is often the case in companies that a plurality of barcodes will be applied on a document. This has the disadvantage that, in the scanning process, the wrong barcode may be read and the further processing of the document is not performed in the manner originally provided.

Thus, it is an object of the invention to provide a simple and inexpensive method for the scanning of documents and the automatic further processing of the documents, and a document which can be scanned and further processed in a simple and inexpensive manner.

SUMMARY OF THE DISCLOSURE

The invention advantageously provides that, in a method for scanning documents, in particular printed sheets of paper, and automatically controlling the further processing of the documents, the following steps are carried out:
   manually applying at least one marking to an area of the document that is not printed on,
   scanning the document,
   automatically detecting the at least one marking applied to the margin area of the document, and
   automatically controlling the further processing of the document according to the marking applied in the margin area.

This has the advantage that the markings can be applied manually. Thus, the markings can be applied on the to-be-scanned documents in a simple and inexpensive manner. The document will be further processed according to the markings applied in the margin area. Thus, there is possible not only a simple separation of the documents but also the controlling of the further processing.

Preferably, the at least one marking can be applied with the aid of a pen. Since the marking can be applied using a normal pen, the to-be-scanned documents can be quickly prepared for scanning. Thus, in contrast to bar code printers or bar code stickers, considerable time can be saved.

The further processing of the documents can be of a digital and/or mechanical type. Thus, for instance, the scanned documents can be further processed in a digital manner, e.g. on a computer or server. It is also possible that the scanned documents, subsequently to the scanning, are further processed in a mechanical manner with the aid of a device connected to the scanner. Such a further processing of the mechanical type can consist e.g. in hole-punching the document and/or tacking the document.

A plurality of markings can be applied in the unprinted margin area.

In the automatic detection of the at least one marking applied to the margin area of the document, the color and/or shape of the marking can be detected.

According to the color and/or shape of the marking, a command can be output for automatic control of the further processing of the document.

If a plurality of markings of different colors have been applied in the margin area, it can be checked during the detection of the markings which colors the markings have. Depending on which colors the markings have, one or a plurality of commands can be output for automatic control of the further processing of the document.

Further, in the automatic detection of the at least one marking, the margin area of the scanned document can be divided into a plurality of areas. Then, it can be checked in which area of the margin area the at least one marking is arranged, wherein the document, according to the area in which the at least one marking is arranged, will output a command for automatic control of the further processing of the document.

The margin area can be divided into three to fifteen, preferably ten areas.

If a plurality of markings have been applied in the margin area, it can be detected during the detection of the markings in which areas the markings have been applied. According to the areas in which the markings have been arranged, one or a plurality of commands can be output for control of the further processing of the document.

The further processing, particularly the digital further processing, can be a storing and/or sorting and/or assigning and/or password encryption and/or compressing and/or categorization and/or automatic text recognition and/or document separation process.

The mechanical further processing can be e.g. a process of hole-punching the documents and/or stapling and respectively tacking the documents.

In case of a the digital further processing, the scanned document will preferably be further processed without a marking. This means that the document will e.g. be stored without a marking. This has the advantage that, when the scanned document is e.g. printed, the markings will not exist anymore on the document. These documents can then be newly marked by a different department.

Further, it can be provided that the document will be stored and password-encrypted. This means that the document can be displayed in a readable manner only after input of the password.

Further, the invention advantageously provides that, in a document which can be scanned and be subjected to mechanical and/or digital further processing, an unprinted margin area has been divided into areas and that, in at least one of these areas of the unprinted margin area, a manually applied marking is arranged.

The marking can be applied by a pen. The document can be a sheet of paper.

A plurality of manually applied markings can be arranged in the margin area.

The at least one manually applied marking in the margin area can comprise a color and/or shape.

In case of a plurality of markings applied in the margin area, the various markings can comprise different colors and/or different shapes.

Further, the invention advantageously provides that, in a system for scanning documents, in particular printed sheets of paper, and for automatically controlling the further processing of the scanned documents (1), comprising
 a data processing device (30), particularly a computer,
 a scanner (10), and
 at least one document (1) adapted to be scanned by the scanner (10),
 the document (1) adapted to be scanned comprises a margin area (2) and said margin area (2) is divided into areas (4), with at least one area (4) of the imprinted margin area (2) having arranged in it at least one manually applied marking (8),
 the data processing device (30) detecting the markings (8), applied in the margin area (2), of the document (1) scanned by the scanner (10), and
 the data processing device controlling the further processing of the document (1) according to the markings (8) applied in the margin area (2).

When scanning the document, the scanner can compile a digital file which will be sent to the data processing device. Preferably, this digital file is an image file. This image file can be e.g. a jpg or pdf file. In the data processing device, a program can be provided which is able to analyze the digital file that has been transmitted by the scanner to the data processing device. With the aid of this program, it is detected whether the scanned document, which can be an image file, comprises markings in the margin area. Since the scanned document (e.g. the digital image file) is a digital replica of the original document, will thus also be detected whether the original document comprises markings in the margin area.

Depending on whether markings are arranged in the margin area, the digital further processing of the scanned document (e.g. the digital image file) and/or the mechanical further processing of the original documents will be controlled.

The scanner can be a commercially available scanner. It is to be understood, however, that there can be used also any other device, such as e.g. a photo apparatus or a camera, by which one can generate a digital image (e.g. a photo) of a document.

Exemplary embodiments of the invention will be explained in greater detail hereunder with reference to the drawings.

DETAILED DESCRIPTION

Figure 1:
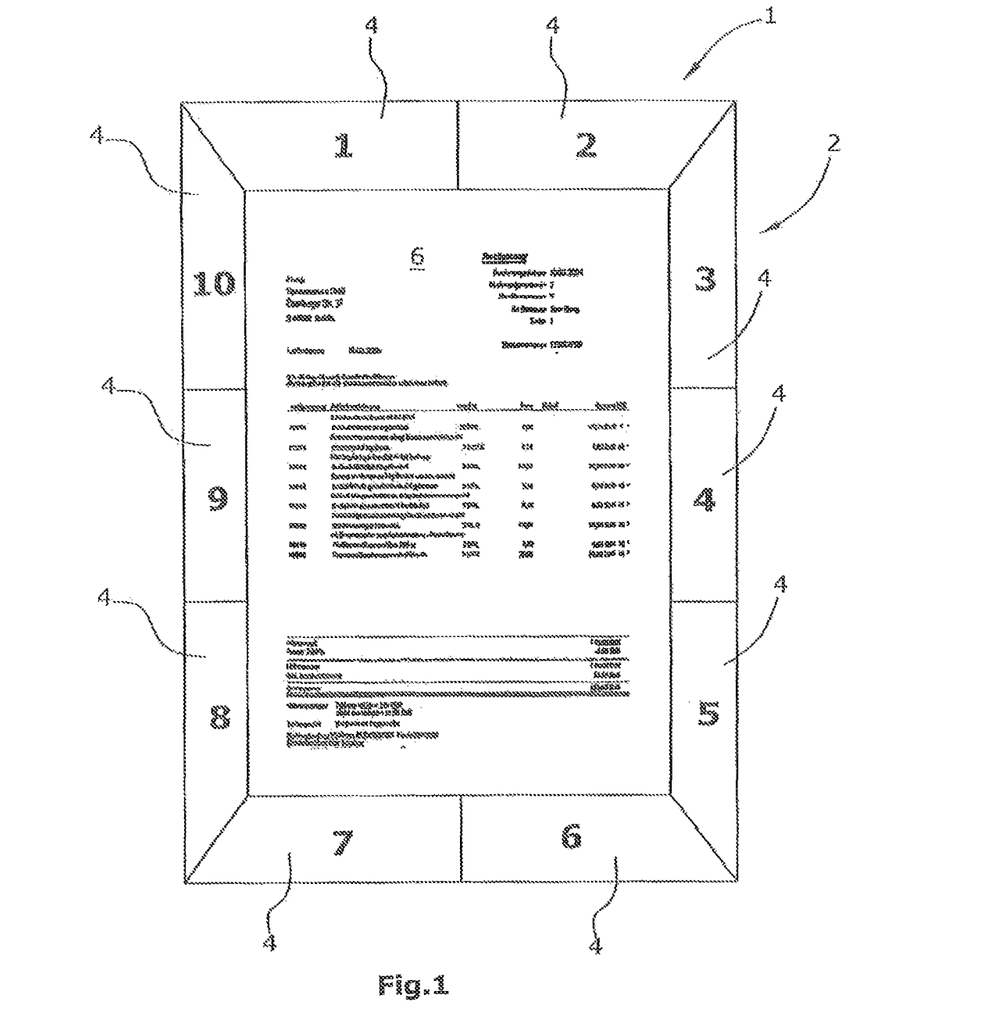
FIG. 1 is a view of a document with unprinted margin area.

FIG. 1 illustrates a document 1. This document 1 comprises a printed area 6 and an unprinted margin area 2.

Said margin area is a surface and respectively field located on the margin and respectively side of the document. The margin area can have a width of e.g. 2 cm from the edge. In FIG. 1, the unprinted margin area 2 is arranged on all four sides and respectively margins of document 1. However, the imprinted margin area 2 can also be arranged only on one, two or three sides and respectively margins of document 1.

The unprinted margin area 2 is divided into a plurality of areas 4. In FIG. 1, margin area 2 is divided into ten areas 4. The areas 4 are fields arranged in margin area 2. These fields have the same width as margin area 2, e.g. 2 cm, and they can have a length of e.g. 8 cm to 10 cm.

Preferably, the above division into said areas 4 is a non-visible division. This means that the document 1 preferably does not comprise printed lines provided for delimiting the areas 4. It is only determined that such a document comprises e.g. ten areas 4 within the imprinted margin area 2. Further, it is determined that the margin area 2 has a defined width and the areas 4 of margin area 2 have a defined size. The markings to be manually applied can then be arranged within the areas 4 which are precisely defined geometrically.

In the imprinted margin area 2, at least one marking 8 can be applied. This at least one marking 8 can be applied e.g. with the aid of a pen 9.

Figure 2:
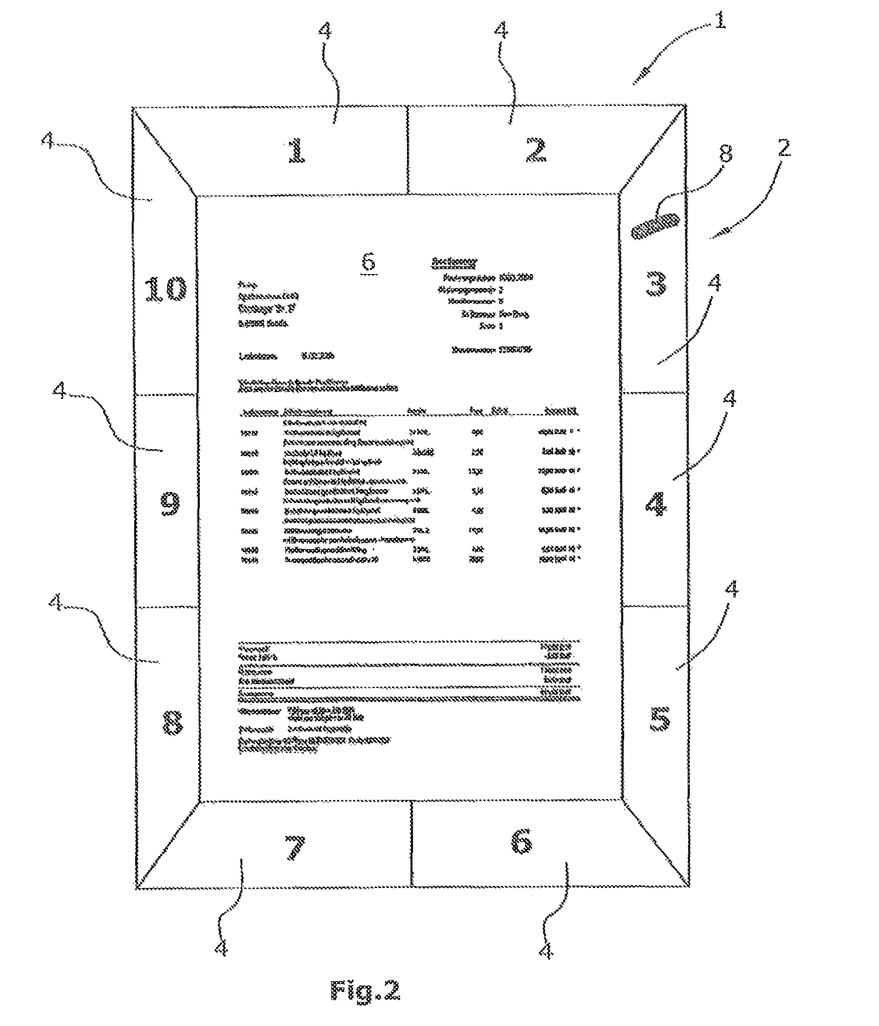
FIG. 2 is a view of a document provided with a marking applied in the margin area.

In FIG. 2, a marking 8 is arranged in one of the areas 4 of margin area 2. This marking can comprise a color, e.g. red.

Figure 3:
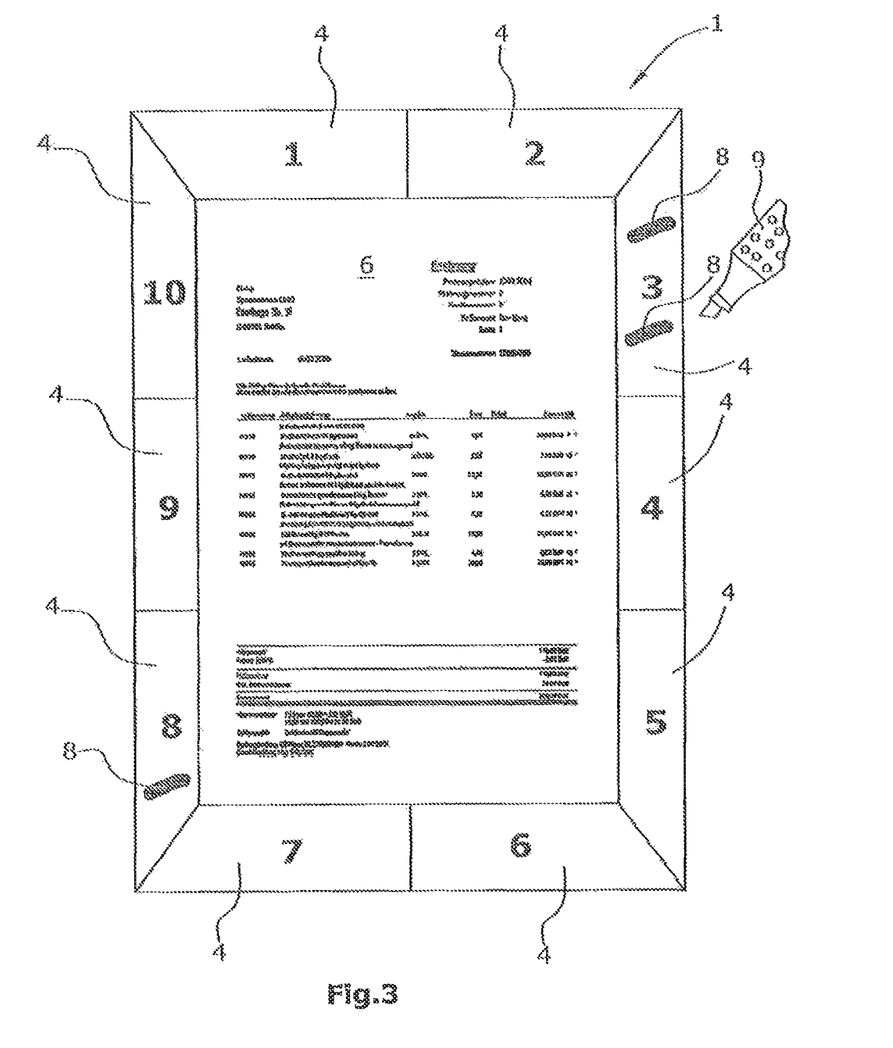
FIG. 3 is a view of a document provided with a plurality of markings applied in the margin area.

In FIG. 3, a plurality of markings have been applied in different areas 4 with the aid of a pen 9. Two of the markings are arranged in the same area 4. The third marking is arranged in another area 4. Also these markings can comprise different colors or identical colors.

Figure 4:
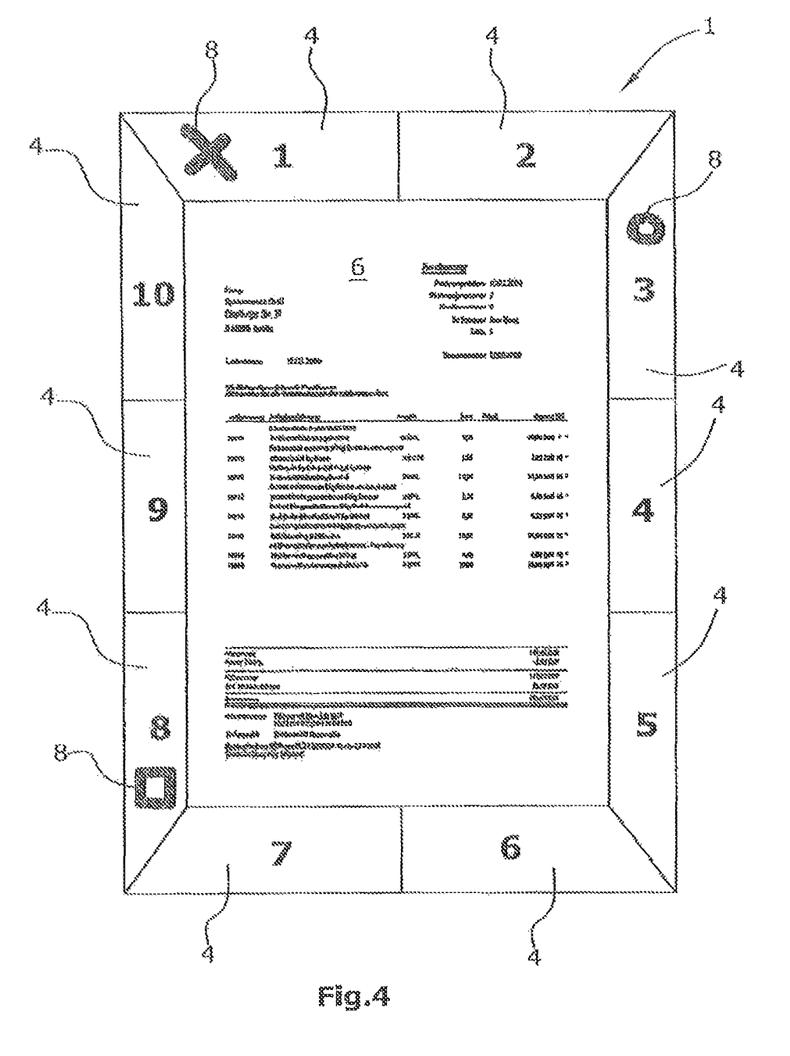
FIG. 4 is a view of a document provided with markings of different shapes.

In FIG. 4, markings of different shapes are arranged in different areas 4 of the unprinted margin area 2. These differently shaped markings can also comprise different colors.

For facilitating the dividing of margin area 2 into areas, use can be made of a template which is adapted to the size of document 1 and can be laid onto document 1. Said template, not shown in the Figures, can comprise cut-out regions corresponding to the size of the areas 4. Such a template can be laid onto document 1 in such a manner that said cut-out regions are located exactly on the site of the areas 4. Thus, the arrangement of the areas 4 can be represented with the aid of the cut-out regions of the template. The manual markings can be applied through the cut-out regions onto the areas 4 of the margin area. On such a template, notes can be provided next to the cut-out regions, indicating which control commands will result from specific markings or combinations of markings.

Figure 5:
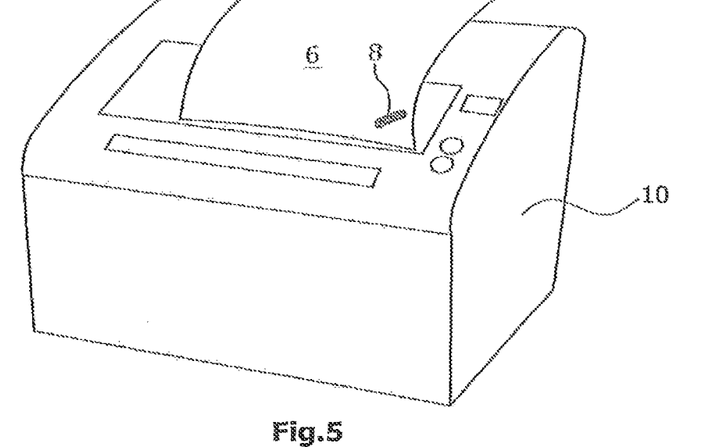
FIG. 5 is a view of a scanner with a document to be scanned.

FIG. 5 illustrates the manner in which a document 1 with a marking 8 will be scanned by scanner 10. From FIG. 5, it can be gathered that the margin area 2 and the areas 4 of margin area 2 are merely non-visible areas, i.e. that these are not delimited by visible lines on document 1.

Particularly, the documents 1 can be printed sheets of paper. A document 1 can consist of one or a plurality of sheets of paper. Thus, for instance, document 1 can consist of a multi-page letter. Preferably, the at least one marking is applied only on the first sheet of document 1. Alternatively, at least one marking 8 can be provided on each sheet of document 1.

After the at least on marking has been manually applied on the unprinted margin area 2 of document 1, document 1 can be scanned by means of scanner 1. After the scanning of document 1, the markings 8 applied on margin area 2 of document 1 will be automatically detected. This can be performed e.g. with the aid of a special program on a server or on a computer.

According to the at least one marking 8 applied in margin area 2, the further processing of document 1 will be automatically controlled.

Figure 6:
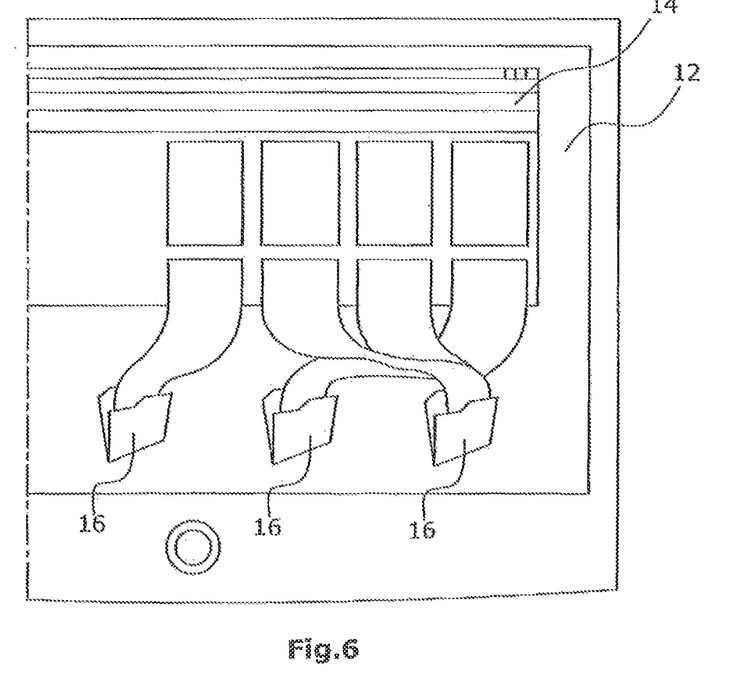
FIG. 6 is a view of a screen on which a plurality of scanned digital documents are displayed.
Figure 7:
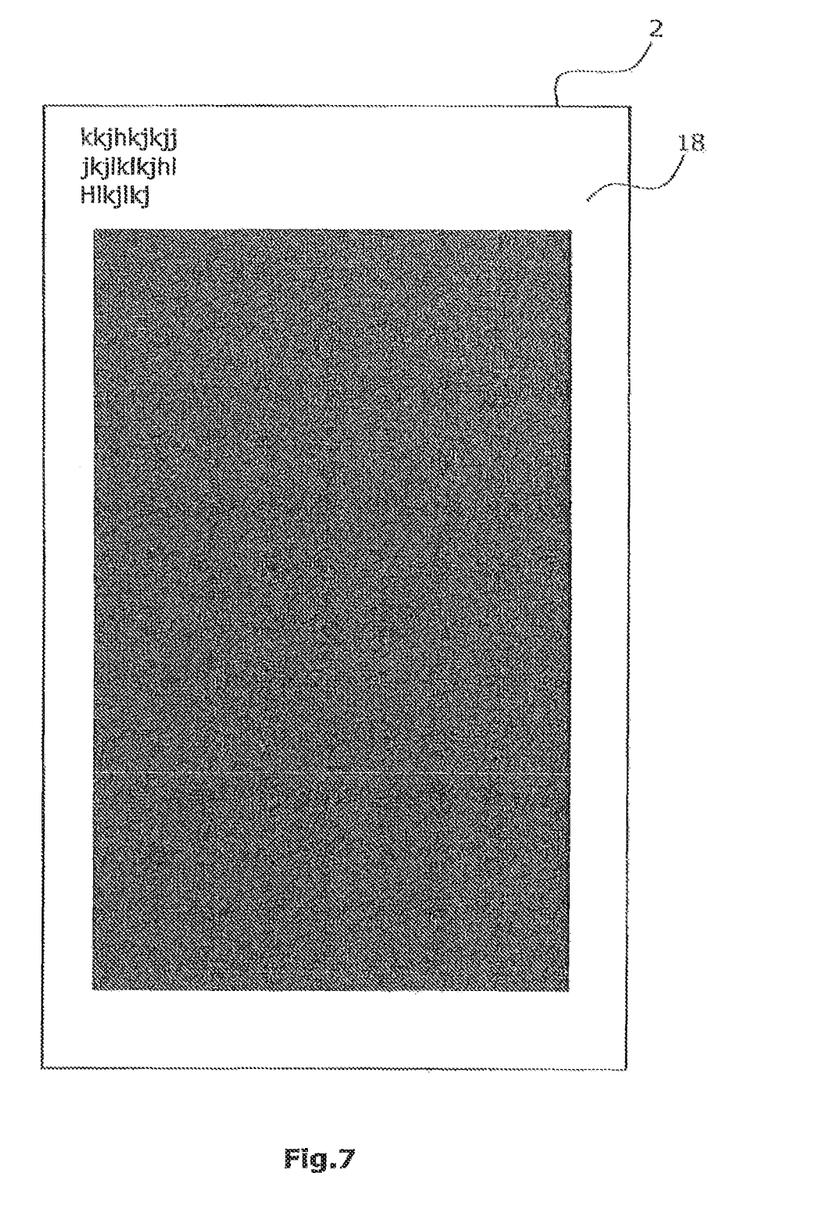
FIG. 7 is a view of a digital scanned document with password encryption.

The scanned documents 1 can be assigned e.g. to different files 16 and be stored therein. This is illustrated in FIG. 6. In FIG. 6, there is depicted a screen 12 on which a digital window 14 is presented. Therein, the scanned documents 1 can be seen. These scanned documents 1 will then be further processed in different manners according to the markings 8 applied on the margin area 2. For instance, the scanned documents 1 can be stored in different files or be stored with different inscriptions. The digital further processing can also be a sorting and/or assigning and/or password encryption and/or compressing and/or categorization and/or automatic text recognition and/or document separation process. It is to be understood that the digital further processing may be any possible digital further processing which can be carried out e.g. on a computer in response to one or a plurality of commands.

Thus, for instance, in case of a marking 8 as shown in FIG. 2, there can be output a control command to assign the scanned document 1 to the file "debit notes" of a specific company.

In the automatic detection of the at least one marking, the color and/or shape of the marking and/or the arrangement in a specific area 4 of the margin area 2 can be detected. According to the color and/or shape and/or arrangement in a specific area 4, one or a plurality of commands for automatic control of the further processing can be output. It is determined beforehand which color and/or shape and/or arrangement in a specific area 4 of margin area 2 will entail which command.

In FIG. 3, a plurality of markings 8 are arranged in the margin area 2. These markings 8 can comprise different colors. When a document provided with such markings 8 is being scanned, there can be output e.g. the command to store the debit note in a specific debit note file and at the same time to send a copy to the accounting department via e-mail.

A plurality of markings in the margin area 2 can result in one order or a plurality of orders. Further, a plurality of markings 8 can be black, for instance. In this case, a different command will be output than in case of red markings 8, even if the markings 8 are also arranged in the same area 4.

Further, the different shapes of the markings 8 can be detected and, depending on these shape or shapes of the markings, one or a plurality of commands can be output. Such different shapes can be, for instance, crosses, circles or squares as shown in FIG. 5. These different shapes can be applied, for instance, not only by a pen but also by a stamping device.

Also a specific combination of color, shape and arrangement in a specific area of edge area 4 can entail one or a plurality of previously determined commands.

The scanned document 1 is a digital replica of the to-be-scanned document 1 on which the markings 8 are applied. The scanned document 1 preferably does not comprise the markings 8 applied on the original to-be-scanned document 1. This means that, although the documents 1 are scanned as a whole, only the printed area 6 will be further processed as a scanned document 1. The markings 8 in the margin area 2 will only be scanned, and a command will be output for the further processing of the scanned document 1, and the scanned document 1 will be further processed in accordance with said command. Alternatively, the scanned document 1 can also be further processed together with the scanned markings 8.

As far as the scanned documents 1 are further processed without markings, this has the advantage, for instance, that the scanned documents 1 can be printed again without markings, be newly provided with markings and be further processed in another department.

Figure 8:
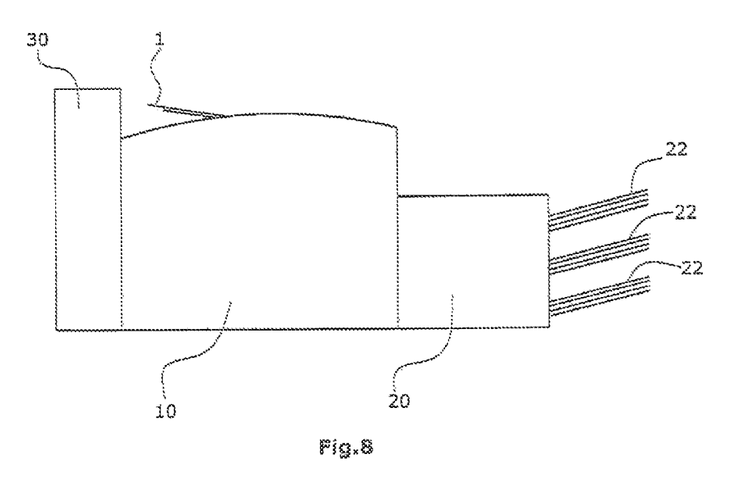
FIG. 8 is a view of a scanner with connected device for mechanical further processing.

The further processing can also be a password encryption of the scanned document 1. This is to say that the area 6 of document 1 that can be printed on will be visible only if the correct password has been entered. In this manner, e.g. the privacy of correspondence can be maintained. Only the person who prepares the document for scanning and provides it with one or a plurality of markings 8 will have knowledge of the content of the printed area 6. In the digital further processing, the scanned document 1 will be further processed only in encrypted form. The printed area 6 of the scanned document 1 could e.g. be blackened as shown in FIG. 8. Only a person knowing the password will be able to have the printed area presented in readable form.

In addition or alternatively to the digital further processing, also mechanical further processing is possible. For such a further processing, e.g., a device 12 for mechanical further processing can be connected to the scanner 10. Such a device 12 for mechanical further processing can be provided e.g. to hole-punch and/or to staple the scanned documents 1. Also this mechanical further processing is automatically controlled according to the markings 8 applied in the margin area. Thus, for instance, specific documents 1 bearing specific markings 8 can be hole-punched only and other can be stapled only. Other documents 1 in turn can e.g. be hole-punched and stapled.

The invention claimed is:

1. A method for scanning documents, in particular printed sheets of paper, and automatically controlling the further processing of the scanned documents, comprising
    manually applying at least one marking to a margin area of the document that is not printed on,
    scanning the document,
    automatically detecting the at least one marking applied to the margin area of the document, and
    automatically controlling the further processing of the document according to the marking applied in the margin area, wherein said further processing is at least one of a digital and mechanical type processing of the document.

2. The method according to claim 1, wherein the marking is applied with the aid of a pen.

3. The method according to claim 1, wherein a plurality of markings are applied to said non-printed margin area.

4. The method according to claim 1, wherein, in the automatic detection of the at least one marking, there is detected the color and shape of the marking and wherein, according to the color and shape of the marking, a command is output for automatic control of the further processing of the document.

5. The method according to claim 4, wherein, if a plurality of markings of different colors have been applied in the margin area, it is checked during the detection of the markings which colors the markings have, and, depending on which colors the markings have, one or a plurality of commands are output for automatic control of the further processing of the document.

6. The method according to claim 1, wherein, in the automatic detection of the at least one marking, the margin area of the scanned document is divided into a plurality of areas and it is checked in which area of the margin area a marking is arranged, wherein, by the document, according to the area in which the at least one marking is arranged, a command is output for automatic control of the further processing of the document.

7. The method according to claim 6, wherein, if a plurality of markings have been applied in the margin area, it is checked during the detection of the markings in which areas the markings have been applied, and, according to the areas in which the markings have been arranged, one or a plurality of commands are output for control of the further processing of the document.

8. The method according to claim 1, wherein the further processing of the document is a storing and sorting and assigning and password encryption and compressing and categorization and automatic text recognition and document separation process.

9. The method according to claim 8, wherein the scanned document is digitally further processed, particularly stored.

10. A document adapted to be scanned and to be further processed in a mechanical and digital manner, comprising a margin area that is not printed on, said unprinted margin area having been divided into areas and at least one of said areas of the unprinted margin area having arranged in it at least one manually applied marking, wherein said marking indicates a further processing of the document including at least one of a digital and mechanical type processing of the document.

11. The document according to claim 10, wherein the markings can be applied with the aid of a pen.

12. The document according to claim 10, wherein a plurality of manually applied markings are arranged in said margin area.

13. The document according to claim 12, wherein the plurality of markings applied in the margin area comprise different colors and different shapes.

14. A system for scanning documents, in particular printed sheets of paper, and automatically controlling the further processing of the scanned documents, comprising:
  a data processing device, particularly a computer,
  a scanner, and
  at least one document adapted to be scanned by the scanner,
  the document adapted to be scanned comprising a margin area, and said margin area being divided into areas, with at least one area of the unprinted margin area having arranged in it at least one manually applied marking,
  the data processing device detecting the markings, applied in the margin area, of the document scanned by the scanner, and
  the data processing device controlling the further processing of the document according to the markings applied in the margin area, wherein said further processing is at least one of a digital and mechanical type processing of the document.

\* \* \* \* \*